(12) United States Patent
Bi

(10) Patent No.: US 9,872,207 B2
(45) Date of Patent: Jan. 16, 2018

(54) METHOD, DEVICE, AND SYSTEM FOR IDENTIFYING TRAFFIC TYPE ACROSS DEVICES

(71) Applicant: Huawei Technologies Co., Ltd., Shenzhen (CN)

(72) Inventor: Shifei Bi, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 512 days.

(21) Appl. No.: 14/516,795

(22) Filed: Oct. 17, 2014

(65) Prior Publication Data

US 2015/0036660 A1    Feb. 5, 2015

Related U.S. Application Data

(63) Continuation of application No. PCT/CN2012/084226, filed on Nov. 7, 2012.

(30) Foreign Application Priority Data

Apr. 17, 2012   (CN) .......................... 2012 1 0112242

(51) Int. Cl.
*H04W 36/00* (2009.01)
*H04W 28/02* (2009.01)

(52) U.S. Cl.
CPC .... *H04W 36/0011* (2013.01); *H04W 28/0205* (2013.01)

(58) Field of Classification Search
CPC ......... H04W 36/0055; H04W 36/0066; H04W 36/18; H04W 40/36
See application file for complete search history.

(56) References Cited

U.S. PATENT DOCUMENTS 6,606,315 B1    8/2003  Albert et al.
2003/0156559 A1    8/2003  Yi et al.
(Continued)

FOREIGN PATENT DOCUMENTS

CN    101043641 A    9/2007
CN    101388848 A    3/2009
(Continued)

OTHER PUBLICATIONS

Partial English Translation and Abstract of Chinese Patent Application No. CN101043641A, dated Apr. 11, 2014, 22 pages.
(Continued)

*Primary Examiner* — Romani Ohri
(74) *Attorney, Agent, or Firm* — Conley Rose, P.C.

(57) ABSTRACT

A method, a device, and a system for identifying a traffic type across devices are provided, where the method includes: obtaining, by a source service control device, flow identification information of a service flow transmitted between a user equipment and a network; and synchronizing the obtained flow identification information to a target service control device when detecting that the user equipment is handed over from the source service control device to the target service control device to transmit the service flow with the network, so that the target service control device identifies, according to the flow identification information, the traffic type of the service flow transmitted between the user equipment and the network. Thus an operator is facilitated to implement network service control such as bandwidth control and virus prevention efficiently without changing an existing architecture.

19 Claims, 6 Drawing Sheets

(56) References Cited

U.S. PATENT DOCUMENTS

| | | | |
|---|---|---|---|
| 2004/0213152 A1 | 10/2004 | Matuoka et al. | |
| 2006/0136518 A1* | 6/2006 | Creamer | G06F 17/30575 |
| 2010/0132031 A1* | 5/2010 | Zheng | H04L 63/0227 |
| | | | 726/13 |
| 2013/0044694 A1* | 2/2013 | Aguirre | H04W 28/16 |
| | | | 370/329 |

FOREIGN PATENT DOCUMENTS

| | | |
|---|---|---|
| CN | 101399749 A | 4/2009 |
| CN | 101765169 A | 6/2010 |
| CN | 101945021 A | 1/2011 |
| CN | 102655474 A | 9/2012 |

OTHER PUBLICATIONS

Partial English Translation and Abstract of Chinese Patent Application No. CN101765169A, dated Apr. 11, 2014, 16 pages.

Partial English Translation and Abstract of Chinese Patent Application No. CN101945021A, dated Sep. 2, 2014, 4 pages.

Partial English Translation and Abstract of Chinese Patent Application No. CN102655474A, dated Sep. 2, 2014, 4 pages.

Foreign Communication From A Counterpart Application, Chinese Application No. 201210112242.0, Chinese Office Action dated Mar. 25, 2014, 8 pages.

Foreign Communication From A Counterpart Application, Chinese Application No. 201210112242.0, Chinese Search Report dated Mar. 14, 2014, 2 pages.

Foreign Communication From A Counterpart Application, PCT Application No. PCT/CN2012/084226, English Translation of International Search Report dated Jan. 31, 2013, 2 pages.

Foreign Communication From A Counterpart Application, PCT Application No. PCT/CN2012/084226, English Translation of Written Opinion dated Jan. 31, 2013, 12 pages.

* cited by examiner

METHOD, DEVICE, AND SYSTEM FOR IDENTIFYING TRAFFIC TYPE ACROSS DEVICES

CROSS-REFERENCE TO RELATED APPLICATIONS

This application is a continuation of International Application No. PCT/CN2012/084226, filed on Nov. 7, 2012, which claims priority to Chinese Patent Application No. 201210112242.0, filed on Apr. 17, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of wireless communication, and in particular, to a method, a device, and a system for identifying a traffic type across devices.

BACKGROUND

Nowadays, more and more applications are borne on networks, and bandwidth requirements are becoming higher and higher. Meanwhile, the value brought by a network is mostly enjoyed by service providers. As for operators, more and more network devices and bandwidths are added to meet the requirements of increasing network development. In the field of wireless communication, bandwidth resources are of higher value. However, with constant increase of traffic of Peer-to-Peer (P2P) and so on in the wireless communication, the traffic consumes the majority of bandwidth resources, which leads to a great delay of services that require fast response to user requests, such as web page browsing, which affects user experience. Meanwhile, for Internet users, network virus intrusion also affects user experience. How to ensure network security is also an issue to be considered by an operator.

Currently, technologies for detecting traffic and controlling a bandwidth include the Deep Packet Inspection (DPI) technology, and technologies for preventing network virus intrusion include the Intrusion Prevention System (IPS). Both the DPI technology and the IPS technology are capable of identifying traffic types of service flows that pass through a service control device, thereby performing different bandwidth control or anti-virus policies on different types of traffic.

Methods for identifying traffic types include association identification. With regard to specific P2P protocols, before a service flow is transmitted between a user equipment and another host in a network, a control flow transmits information such as an Internet Protocol (IP) address, a port number, and a transport layer protocol type of the service flow. In transmission of the service flow, packet statistics information of the service flow is obtained, and then the information such as the IP address, the port number, and the transport layer protocol type and the packet statistics information are cached in a storage device as flow identification information of the service flow. When a subsequent packet of the service flow passes the service control device, the service control device can search for the cached flow identification information according to information of the subsequent packet; therefore, the traffic type of the service flow can be identified.

However, when a traffic type is identified by using the foregoing association identification method, if the user performs a handover between service control devices, that is, hands over to another service control device to transmit the service flow with a network server, for example, the user moves from one base station to another base station when browsing a web page, because a target service control device has no flow identification information of the service flow after the handover, the target service control device fails to determine the traffic type of the service flow according to the flow identification information, and the traffic type needs to be identified by using other identification methods, which brings burden to the target service control device or even leads to failure of identifying the traffic type of the service flow.

SUMMARY

Embodiments of the present invention aim to provide a method, a device, and a system for identifying a traffic type across devices, so that a target service control device can also perform traffic type identification on a corresponding service flow directly when a user equipment is handed over between service control devices.

To solve the above technical problem, an embodiment of the present invention provides a method for identifying a traffic type across devices, including: obtaining, by a source service control device, flow identification information of a service flow transmitted between a user equipment and a network, where the flow identification information is used for the source service control device to identify a traffic type of the service flow; and synchronizing, by the source service control device, the flow identification information to a target service control device, when detecting that the user equipment is handed over from the source service control device to the target service control device to transmit the service flow with the network, so that the target service control device identifies, according to the flow identification information, the traffic type of the service flow transmitted between the user equipment and the network.

Correspondingly, an embodiment of the present invention further provides a service control device, including: an obtaining module configured to obtain flow identification information of a service flow transmitted between a user equipment and a network, where the flow identification information is used for the service control device to identify a traffic type of the service flow when the service control device being a source service control device; and a synchronizing module configured to synchronize the obtained flow identification information to a target service control device when detecting that the user equipment is handed over from the source service control device to the target service control device to transmit the service flow with the network, so that the target service control device identifies, according to the flow identification information, the traffic type of the service flow transmitted between the user equipment and the network.

Correspondingly, an embodiment of the present invention further provides a system for identifying a traffic type across devices, including a source service control device, a target service control device, and a user equipment, where: the user equipment is configured to transmit a service flow with a network through the source service control device; the source service control device is configured to: obtain flow identification information of the service flow transmitted between the user equipment and the network when the user equipment transmits the service flow with the network through the source service control device, where the flow identification information is used for the source service control device to identify a traffic type of the service flow; and synchronize the obtained flow identification information to the target service control device when detecting that the user equipment is handed over from the source service control device to the target service control device to transmit the service flow with the network; and the target service control device is configured to identify, according to the flow identification information, the traffic type of the service flow transmitted between the user equipment and the network.

Correspondingly, an embodiment of the present invention further provides a system for identifying a traffic type across devices, including a source service control device, a target service control device, a synchronization server, and a user equipment, where: the user equipment is configured to transmit a service flow with a network through the source service control device; the source service control device is configured to: obtain flow identification information of the service flow transmitted between the user equipment and the network when the user equipment transmits the service flow with the network through the source service control device, where the flow identification information is used for the source service control device to identify a traffic type of the service flow; and synchronize the obtained flow identification information to the synchronization server when detecting that the user equipment is handed over from the source service control device to the target service control device to transmit the service flow with the network; and the synchronization server is configured to send the flow identification information to the target service control device; and the target service control device is configured to identify, according to the flow identification information, the traffic type of the service flow transmitted between the user equipment and the network.

The following beneficial effects are achieved by implementing the embodiments of the present invention:

In the present invention, by synchronizing flow identification information, a traffic type of a corresponding service flow can also be identified directly and conveniently when a user equipment is handed over between service control devices. Therefore, the traffic type identification burden of the service control device is relieved, identification efficiency is improved, and an operator is facilitated to implement network service control such as bandwidth control and virus prevention efficiently without changing an existing architecture. Moreover, a problem of reduced traffic identification rates, which is caused by failure to identify certain traffic after the user equipment is handed over between service control devices, can be avoided.

DETAILED DESCRIPTION

The following clearly and completely describes the technical solutions in the embodiments of the present invention with reference to the accompanying drawings in the embodiment of the present invention. The described embodiments are merely a part of the embodiments of the present invention rather than all of the embodiments. All other embodiments obtained by persons of ordinary skill in the art based on the embodiments of the present invention without creative efforts shall fall within the protection scope of the present invention.

Figure 1:
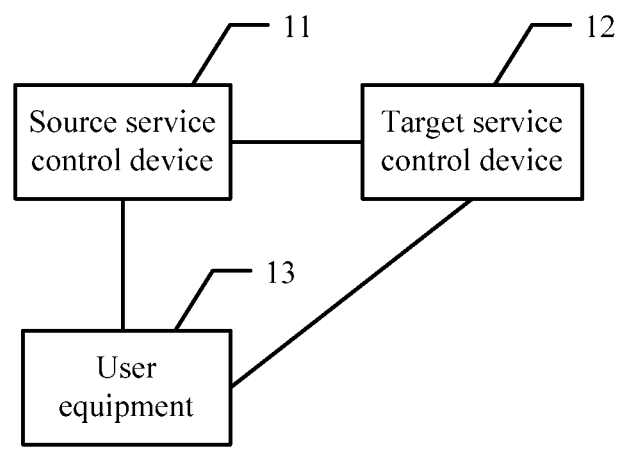
FIG. 1 is a schematic diagram of a logical structure of a system for identifying a traffic type across devices according to an embodiment of the present invention.

FIG. 1 is a schematic diagram of a logical structure of a system for identifying a traffic type across devices according to an embodiment of the present invention. The system in this embodiment includes a source service control device 11, a target service control device 12, and a user equipment 13.

The user equipment 13 is configured to transmit a service flow with a network through the source service control device 11.

The source service control device 11 is configured to: obtain flow identification information of the service flow transmitted between the user equipment 13 and the network when the user equipment 13 transmits the service flow with the network through the source service control device 11, where the flow identification information is used for the source service control device 11 to identify a traffic type of the service flow; and synchronize the obtained flow identification information to the target service control device 12 when detecting that the user equipment 13 is handed over from the source service control device 11 to the target service control device 12 to transmit the service flow with the network.

The target service control device 12 is configured to identify, according to the flow identification information, the traffic type of the service flow transmitted between the user equipment and the network.

Figure 2:
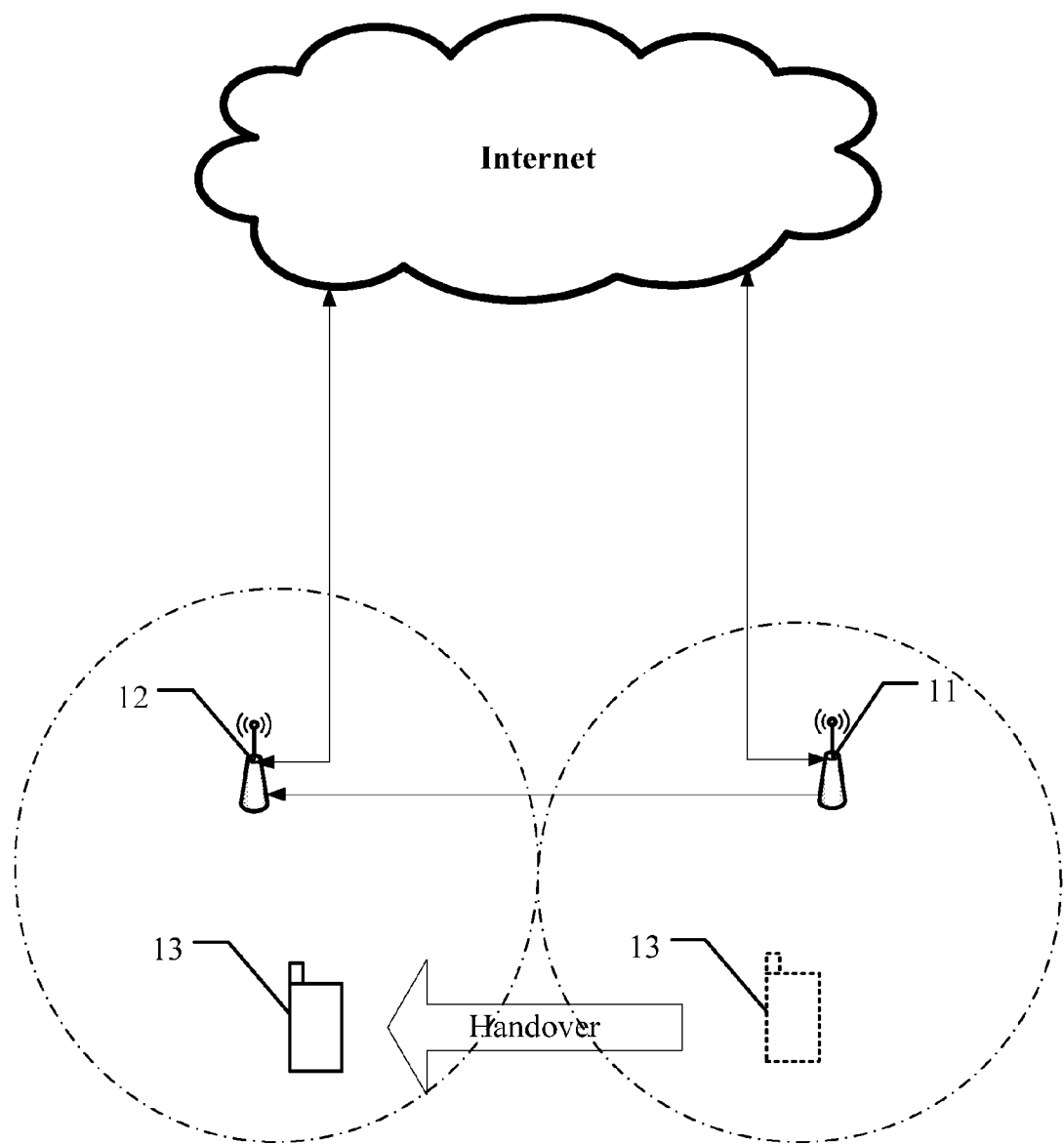
FIG. 2 is a schematic diagram of a network deployment of the system shown in FIG. 1.

Refer to FIG. 2, which is a schematic diagram of a network deployment of the system provided in this embodiment.

At an initial stage, the source service control device 11 obtains the flow identification information of the service flow transmitted between the user equipment 13 and the network when the user equipment 13 transmits the service flow with another host in the network through the source service control device 11, and identifies, according to the flow identification information, a traffic type of subsequent service flows transmitted between the user equipment 13 and another host in the network.

The source service control device 11 synchronizes the obtained flow identification information to the target service control device 12 when the source service control device 11 detects that the user equipment 13 is handed over from the source service control device 11 to the target service control device 12 to transmit the service flow with the network; and the target service control device 12 identifies, according to the flow identification information, the traffic type of the service flow transmitted between the user equipment 13 and the network and packets of the service flow borne by the service control device.

The user equipment 13 transmits service data with another host such as a server or another terminal device on the network. Transmitted service flows include a HyperText Transfer Protocol (HTTP) service flow, a File Transfer Protocol (FTP) service flow, audio and video service flows, and the like. When a user is moving, the user equipment 13 is handed over from the source service control device 11 to the target service control device 12 to transmit service data with the server or another terminal device on the network. The network in the embodiment of the present invention may be a core network, Internet, or an enterprise intranet in communication networks, which is not limited in the embodiment of the present invention. The user equipment 13 may belong to the network or another network that can communicate with the network.

The obtained flow identification information includes: packet statistics information of the service flow transmitted between the user equipment and the network, and/or triplet information of the service flow transmitted between the user equipment and the network, and the like. Specifically, the packet statistics information includes information such as uplink and downlink directions of packets in the service flow transmitted between the user equipment and another host in the network, and the number of packets; and the triplet information includes IP information, port information, and transport layer protocol type of the transmitted flow; and certainly, quintuple information may also be obtained as required.

Understandably, in the embodiment of the present invention, the user equipment 13 may be called a Terminal, a Mobile Station (MS), a Mobile Terminal, and the like. The user equipment may communicate with one or more core networks by using a Radio Access Network (RAN). For example, the user equipment may be a mobile phone (or called a "cellular" phone), a computer with a mobile terminal, and the like. For example, the user equipment may also be a mobile apparatus that is portable, pocket-sized, hand-held, built in a computer, or mounted on a vehicle. The user equipments exchange voice and/or data with a radio access network. The source service control device 11 and the target service control device 12 may refer to intermediate devices that need to be passed when the user equipment communicates with another host in the network. When communicating with another host, the user equipment may be handed over between such intermediate devices such as a DPI device in a base station, a device equipped with an intrusion prevention system, and a Wireless Fidelity (WiFi) access point.

A user located in an effective control area of the source service control device 11 may use the user equipment 13 to access the Internet through the source service control device 11 to browse a web page. In this case, the source service control device 11 obtains flow identification information of the service flow transmitted between the user equipment 13 and a server where the web page is located. Therefore, the source service control device 11 can identify a traffic type of a subsequent packet of the service flow according to the obtained flow identification information, for example, identify that the service flow is an HTTP service flow or an FTP service flow.

In this period, due to the movement of the user, the user equipment 13 may move from an area controlled by the source service control device 11 to an area controlled by the target service control device 12. That is to say, the user equipment 13 is handed over from the source service control device 11 to the target service control device 12 to access the Internet to browse the web page. The source service control device 11 synchronizes the obtained flow identification information to the target service control device 12. Therefore, according to the synchronized flow identification information, the target service control device 12 may perform association identification directly to identify the traffic type of the subsequent packet of the service flow.

The source service control device 11 may determine that the user equipment 13 is handed over from the source service control device 11 to the target service control device 12 when detecting that the target service control device 12 requests user information of the user equipment 13, for example, requests user account information of the user equipment 13. The source service control device 11 may perform sequencing on the identification information in a specified format first, and then send the sequenced information to the target service control device 12; and the target service control device 12 performs anti-sequencing on the sequenced information in the specified format to recover and to obtain the identification information.

Specifically, when synchronizing the user information of the user equipment 13 to the target service control device 12, the source service control device 11 may send the flow identification information as a part of the user information to the target service control device 12, or create a connection to the target service control device 12 to synchronize the flow identification information. The source service control device 11 may delete locally stored flow identification information after sending the flow identification information to the target service control device 12.

In the embodiment of the present invention, by synchronizing flow identification information, a traffic type of a corresponding service flow can also be identified directly and conveniently when a user equipment is handed over between service control devices. Therefore, the traffic type identification burden of the service control device is relieved, identification efficiency is improved, and an operator is facilitated to implement network service control such as bandwidth control and virus prevention efficiently without changing an existing architecture. Moreover, a problem of reduced traffic identification rates, which is caused by failure to identify certain traffic after the user equipment is handed over between service control devices, can be avoided.

Figure 3:
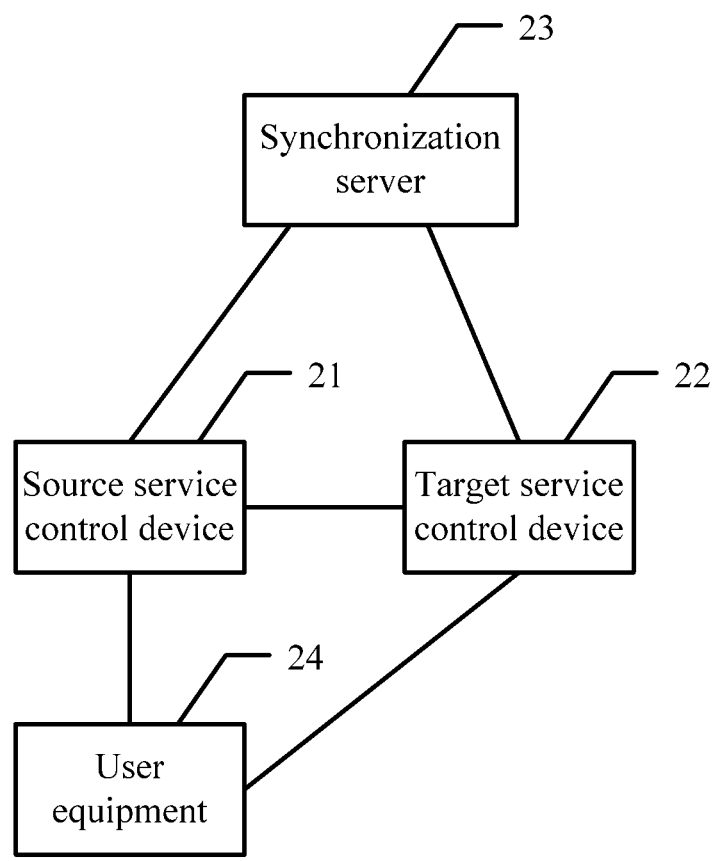
FIG. 3 is a schematic diagram of a logical structure of another system for identifying a traffic type across devices according to an embodiment of the present invention.

FIG. 3 is a schematic diagram of a logical structure of another system for identifying a traffic type across devices according to an embodiment of the present invention. The system in this embodiment includes a source service control device 21, a target service control device 22, a synchronization server 23, and a user equipment 24.

The user equipment 24 is configured to transmit a service flow with a network through the source service control device 21.

The source service control device 21 is configured to: obtain flow identification information of the service flow transmitted between the user equipment 24 and the network when the user equipment 24 transmits the service flow with the network through the source service control device 21, where the flow identification information is used for the source service control device 21 to identify a traffic type of the service flow; and synchronize the obtained flow identification information to the synchronization server 23 when detecting that the user equipment 24 is handed over from the source service control device 21 to the target service control device 22 to transmit the service flow with the network.

The synchronization server 23 is configured to send the flow identification information to the target service control device 22.

The target service control device 22 is configured to identify, according to the flow identification information, the traffic type of the service flow transmitted between the user equipment 24 and the network.

Figure 4:
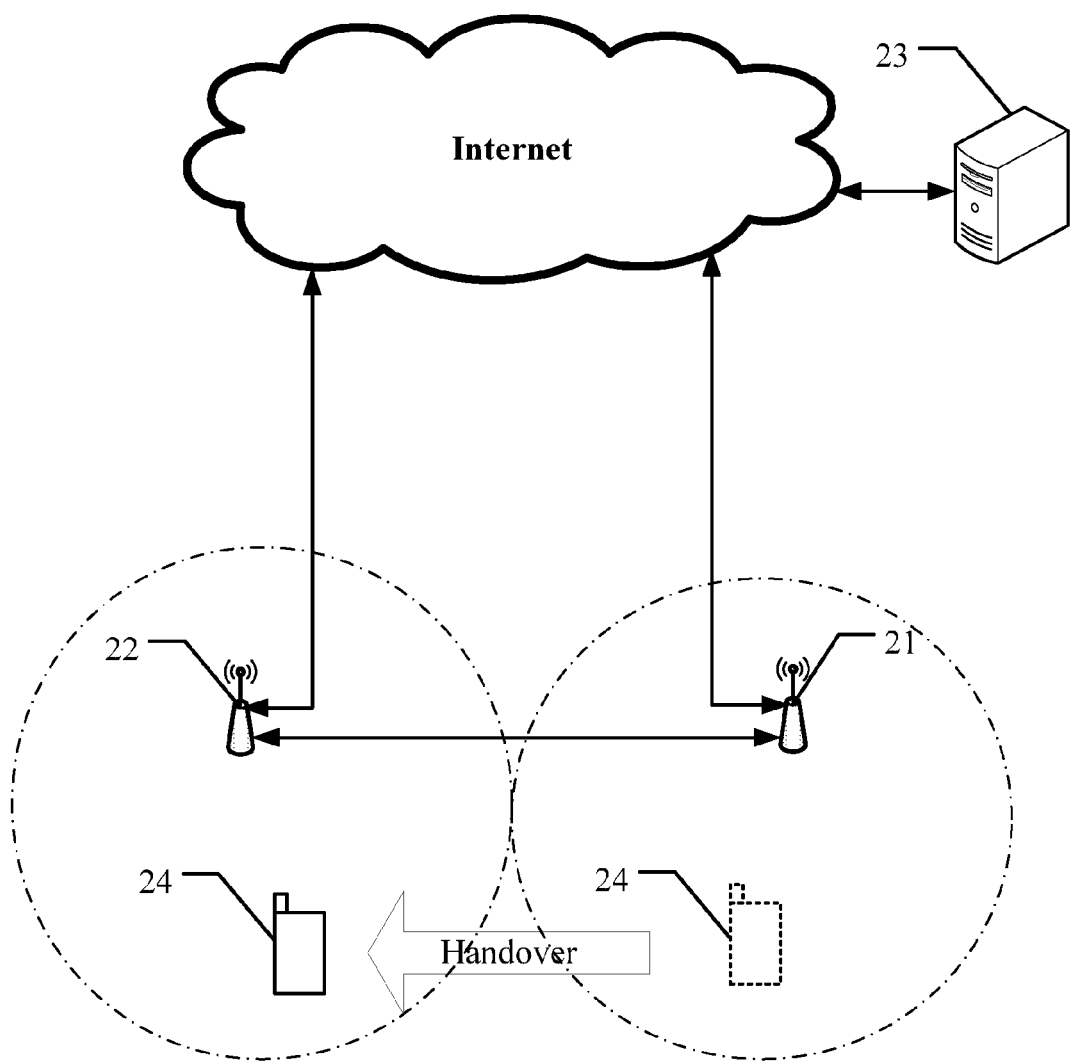
FIG. 4 is a schematic diagram of a network deployment of the system shown in FIG. 3.

Refer to FIG. 4, which is a schematic diagram of a network deployment of the system provided in this embodiment.

The user equipment 24 transmits service data with another host such as a server or another terminal device on the network. Transmitted service flows include an HTTP service flow, an FTP service flow, audio and video service flows, and the like. When a user is moving, the user equipment 24 is handed over from the source service control device 21 to the target service control device 22 to transmit service data with the server or another terminal device on the network.

The obtained flow identification information is flow identification information that is obtained by the source service control device 21 and existent before the handover from the source service control device 21 to the target service control device 22. The obtained flow identification information includes: packet statistics information of the service flow transmitted between the user equipment 24 and the network, and/or triplet information of the service flow transmitted between the user equipment and the network. Specifically, the packet statistics information includes information such as uplink and downlink directions of packets in the service flow transmitted between the user equipment 24 and the network, and the number of packets; and the triplet information includes IP information, port information, and transport layer protocol type; and certainly, quintuple information may also be obtained as required.

The source service control device 21 and the target service control device 22 refer to intermediate devices that need to be passed when the user equipment communicates with another host. When communicating with another host, the user terminal may be handed over between such intermediate devices such as a DPI device in a base station, a device equipped with an intrusion prevention system, and a WiFi access point. The synchronization server 23 is connected to the source service control device 21 and the target service control device 22.

A user located in an effective control area of the source service control device 21 may use the user equipment 24 to access the Internet through the source service control device 21 to browse a web page. In this case, the source service control device 21 obtains flow identification information corresponding to the service flow transmitted between the user equipment 24 and a server where the web page is located. Therefore, the source service control device 21 can identify a traffic type of a subsequent packet of the service flow directly according to the obtained identification information.

In this period, due to the movement of the user, the user equipment 24 may move from an area controlled by the source service control device 21 to an area controlled by the target service control device 22. That is to say, the user equipment 24 is handed over from the source service control device 21 to the target service control device 22 to access the Internet. The source service control device 21 synchronizes the obtained flow identification information to the synchronization server 23. When sending the user information of the user equipment 24 to the target service control device 22, the synchronization server 23 sends the flow identification information to the target service control device 22. Therefore, the target service control device 12 can identify the traffic type of the subsequent packet of the service flow directly according to the flow identification information.

Specifically, the source service control device 21 may determine that the user equipment 24 is handed over from the source service control device 21 to the target service control device 22 when detecting that the user information of the user equipment 24 is synchronized to the target service control device through the synchronization server 23, for example, when detecting that user account information corresponding to the user equipment 24 is synchronized to the target service control device through the synchronization server 23. The source service control device 21 may perform sequencing on the flow identification information in a specified format first, and then send the sequenced formation to the synchronization server 23, the synchronization server 23 sends the sequenced information to the target service control device 22, and then the target service control device 22 performs anti-sequencing on the sequenced formation in the specified format to recover and to obtain the flow identification information. The user information is registered by the source service control device 21 for the synchronization server 23. The source service control device 21 deletes locally stored flow identification information after sending the flow identification information to the synchronization server 23, and the synchronization server 23 deletes the received flow identification information after sending the flow identification information to the target service control device.

In the embodiment of the present invention, by synchronizing flow identification information, a traffic type of a corresponding service flow can also be identified directly and conveniently when a user equipment is handed over between service control devices. Therefore, the traffic type identification burden of the service control device is relieved, identification efficiency is improved, and an operator is facilitated to implement network service control such as bandwidth control and virus prevention efficiently without changing an existing architecture. Moreover, a problem of reduced traffic identification rates, which is caused by failure to identify certain traffic after the user equipment is handed over between service control devices, can be avoided.

Figure 5:
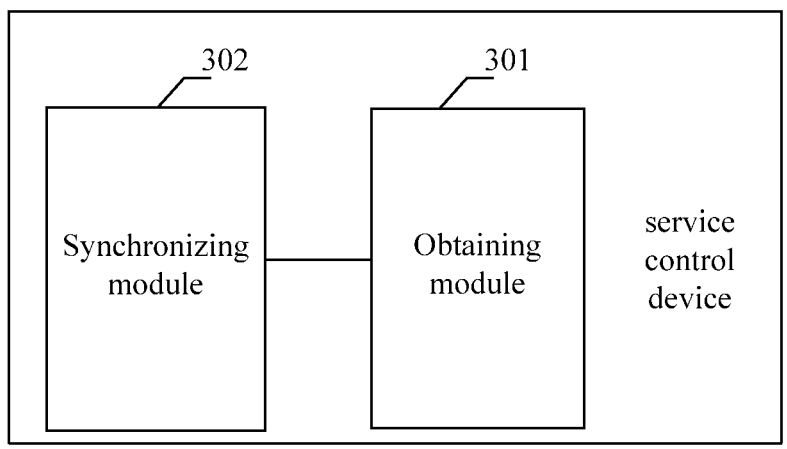
FIG. 5 is a schematic diagram of a logical structure of a service control device according to an embodiment of the present invention.

FIG. 5 is a schematic diagram of a logical structure of a service control device according to an embodiment of the present invention. The service control device in this embodiment includes an obtaining module 301 and a synchronizing module 302.

The obtaining module 301 is configured to obtain flow identification information of a service flow transmitted between a user equipment and a network, where the flow identification information is used for the service control device to identify a traffic type of the service flow when the service control device being a source service control device.

The synchronizing module 302 is configured to synchronize the obtained flow identification information to a target service control device when detecting that the user equipment is handed over from the source service control device to the target service control device to transmit the service flow with the network, so that the target service control device identifies, according to the flow identification information, the traffic type of the service flow transmitted between the user equipment and the network.

The obtained flow identification information includes: packet statistics information of the service flow transmitted between the user equipment and the network, and/or triplet information of the service flow transmitted between the user equipment and the network.

Specifically, the packet statistics information obtained by the obtaining module 301 includes information such as uplink and downlink directions of packets in the service flow transmitted between the user equipment and the network, and the number of packets; and the triplet information includes IP information, port information, and transport layer protocol type; and certainly, quintuple information may also be obtained as required.

Furthermore, optionally, as shown in FIG. 5, the synchronizing module 302 is specifically configured to send the obtained flow identification information to the target service control device when detecting that user information of the user equipment is synchronized to the target service control device.

The service control device in this embodiment may be the source service control device 11 in the above system embodiment, and the target service control device is the target service control device 12. The specific implementation manners may be the same as what is described in the above embodiment, and are not repeated here any further.

In the present invention, by synchronizing flow identification information, a traffic type of a corresponding service flow can also be identified directly and conveniently when a user equipment is handed over between service control devices. Therefore, the traffic type identification burden of the service control device is relieved, identification efficiency is improved, and an operator is facilitated to implement network service control such as bandwidth control and virus prevention efficiently without changing an existing architecture.

An embodiment of the present invention further provides another service control device. The service control device in this embodiment includes an obtaining module 301 and a synchronizing module 302. In this embodiment, the synchronizing module 302 is specifically configured to sequence the flow identification information and send the sequenced flow identification information to the target service control device when detecting that user information of the user equipment is synchronized to the target service control device.

The service control device in this embodiment may be the source service control device 21 in the above system embodiment, and the target service control device is the target service control device 22. The specific implementation manners may be the same as what is described in the above embodiment, and are not repeated here any further.

In the present invention, by synchronizing flow identification information, a traffic type of a corresponding service flow can also be identified directly and conveniently when a user equipment is handed over between service control devices. Therefore, the traffic type identification burden of the service control device is relieved, identification efficiency is improved, and an operator is facilitated to implement network service control such as bandwidth control and virus prevention efficiently without changing an existing architecture. Moreover, a problem of reduced traffic identification rates, which is caused by failure to identify certain traffic after the user equipment is handed over between service control devices, can be avoided.

The following gives a detailed description about a method for identifying a traffic type across devices in the present invention.

Figure 6:
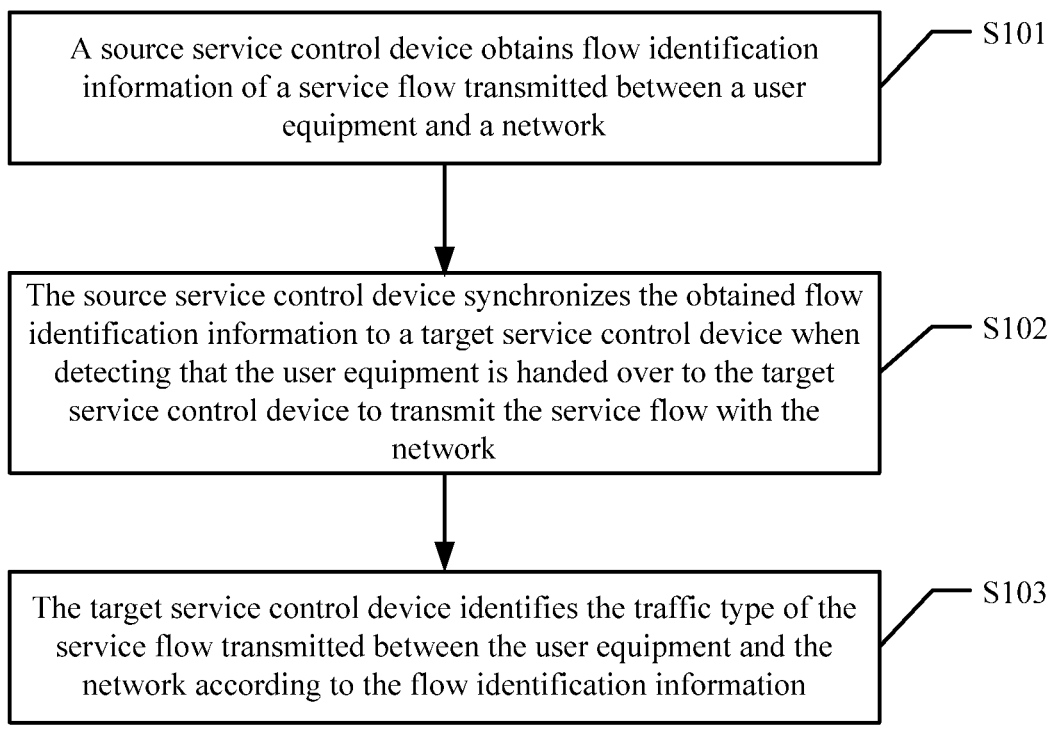
FIG. 6 is a schematic flowchart of a method for identifying a traffic type across devices according to an embodiment of the present invention.

FIG. 6 is a schematic flowchart of a method for identifying a traffic type across devices according to an embodiment of the present invention. The method includes:

S101. A source service control device obtains flow identification information of a service flow transmitted between user equipment and a network, where the flow identification information is used for the source service control device to identify a traffic type of the service flow.

Service flows transmitted between the user equipment and the network include an HTTP service flow, an FTP service flow, audio and video service flows, and the like. The flow identification information obtained in the S101 includes: packet statistics information of the service flow transmitted between the user equipment and the network, and/or triplet information of the service flow transmitted between the user equipment and the network. Specifically, the packet statistics information obtained in the S101 includes information such as uplink and downlink directions of packets in the service flow transmitted between the user equipment and the network, and the number of packets; and the triplet information includes IP information, port information, and transport layer protocol type; and certainly, quintuple information may also be obtained as required.

S102. The source service control device synchronizes the obtained flow identification information to a target service control device when detecting that the user equipment is handed over from the source service control device to the target service control device to transmit the service flow with the network.

S103. The target service control device identifies, according to the flow identification information, the traffic type of the service flow transmitted between the user equipment and the network.

In a case of directly performing synchronization by the service control device and the target service control device, the S102 specifically includes: that the source service control device sends the obtained flow identification information to the target service control device when detecting that the user information corresponding to the user equipment is synchronized to the target service control device may be: sequencing the obtained flow identification information and sending the obtained flow identification information to the target service control device.

Specifically, the source service control device and the target service control device may be a DPI device in a base station, a device equipped with an intrusion prevention system, a WiFi access point, and the like. A user located in an effective control area of the source service control device may use the user equipment to access a network such as the Internet through the source service control device to browse a web page. In this case, the source service control device obtains flow identification information of the service flow transmitted between the user equipment and a server where the web page is located, and identifies a traffic type of a subsequent packet of the service flow according to the identification information.

In this period, due to the movement of the user, the user equipment may move from an area controlled by the source service control device to an area controlled by the target service control device. That is to say, the user equipment is handed over from the source service control device to the target service control device to access the Internet to transmit the service flow with the server of the web page. The source service control device synchronizes the obtained flow identification information to the target service control device. Therefore, according to the flow identification information, the target service control device may directly identify the type of traffic corresponding to the subsequent packet of the service flow.

Specifically, the source service control device may determine that the user equipment is handed over from the source service control device to the target service control device when detecting that the user information of the user equipment is synchronized to the target service control device. The service control device may perform sequencing on the identification information in a specified format first, and then send the sequenced information to the target service control device, and then the target service control device performs anti-sequencing on the sequenced information in the specified format to recover and to obtain the flow identification information.

Specifically, when synchronizing the user information of the user equipment to the target service control device, the source service control device may send the flow identification information as a part of the user information to the target service control device, or create a connection to the target service control device to synchronize the flow identification information.

The service control device may delete locally stored flow identification information after synchronizing the flow identification information.

In addition, the source service control device may synchronize the stored flow identification information to the target service control device through a synchronization server, and the S102 specifically includes: the obtained flow identification information is synchronized to the synchronization server when it is detected that the user information corresponding to the user equipment is synchronized to the target service control device through the synchronization server, and the synchronization server synchronizes the flow identification information to the target service control device, and specifically, the obtained flow identification information is sequenced and sent to the synchronization server, so that the synchronization server sends the flow identification information to the target service control device.

Specifically, the source service control device may determine that the user equipment is handed over from the source service control device to the target service control device when detecting that the user information of the user equipment is synchronized to the target service control device through the synchronization server. The source service control device may perform sequencing on the flow identification information in a specified format first, and then send the sequenced information to the synchronization server, the synchronization server sends the sequenced information to the target service control device, and then the target service control device performs anti-sequencing on the sequenced information in the specified format to recover and to obtain the flow identification information. The user information is registered by the service control device for the synchronization server.

The service control device may delete locally stored flow identification information after sending the flow identification information to the synchronization server. Meanwhile, the synchronization server deletes the locally stored flow identification information after sending the flow identification information to the target service control device.

In the present invention, by synchronizing flow identification information, a traffic type of a corresponding service flow can also be identified directly and conveniently when a user equipment is handed over between service control devices. Therefore, the traffic type identification burden of the service control device is relieved, identification efficiency is improved, and an operator is facilitated to implement network service control such as bandwidth control and virus prevention efficiently without changing an existing architecture. Moreover, a problem of reduced traffic identification rates, which is caused by failure to identify certain traffic after the user equipment is handed over between service control devices, can be avoided.

Persons of ordinary skill in the art may understand that all or a part of the processes of the above method embodiments may be implemented by a computer program instructing relevant hardware. The program may be stored in a computer readable storage medium. When the program is run, the processes included in the above method embodiments are performed. The storage medium may be a magnetic disk, an optical disk, a Read-Only Memory (ROM), or a Random Access Memory (RAM), and the like.

The foregoing disclosures are merely exemplary embodiments of the present invention. However, the scope of rights of the present invention is not limited thereto. Therefore, equivalent modifications derived according to the claims of the present invention shall fall within the scope of the present invention.

What is claimed is:

1. A method for identifying a traffic type of a service flow across devices, comprising:
   obtaining, by a source service control device, flow identification information of a service flow transmitted between a user equipment and a network, wherein the flow identification information is used for the source service control device to identify the traffic type of the service flow; and
   synchronizing, by the source service control device, the flow identification information to a target service control device when detecting that the user equipment is handed over from the source service control device to the target service control device,
   wherein the target service control device identifies, according to the flow identification information, the traffic type of the service flow transmitted between the user equipment and the network,
   wherein the flow identification information includes packet statistics information of the service flow transmitted between the user equipment and the network and triplet information of the service flow transmitted between the user equipment and the network,
   wherein the packet statistics information includes uplink and downlink directions of packets in the service flow transmitted between the user equipment and the network and the number of packets, and
   wherein the triplet information includes Internet Protocol (IP) information, port information, and transport layer protocol type of the transmitted service flow.

2. The method according to claim 1, wherein synchronizing, by the source service control device, the obtained flow identification information to the target service control device when detecting that the user equipment is handed over from the source service control device to the target service control device comprises sending, by the source service control device, the obtained flow identification information to the target service control device when detecting that user information of the user equipment is synchronized to the target service control device.

3. The method according to claim 2, wherein sending, by the source service control device, the obtained flow identification information to the target service control device when detecting that the user information of the user equipment is synchronized to the target service control device comprises:
  sequencing, by the source service control device, the flow identification information; and
  sending, by the source service control device, the sequenced flow identification information to the target service control device when detecting that the user information of the user equipment is synchronized to the target service control device.

4. The method according to claim 1, wherein synchronizing, by the source service control device, the obtained flow identification information to the target service control device when detecting that the user equipment is handed over from source service control device to the target service control device comprises synchronizing, by the source service control device, the flow identification information to a synchronization server when detecting that user information of the user equipment is synchronized to the target service control device through the synchronization server, and wherein the synchronization server synchronizes the flow identification information to the target service control device.

5. The method according to claim 4, wherein synchronizing, by the source service control device, the flow identification information to the synchronization server, wherein the synchronization server synchronizes the flow identification information to the target service control device when detecting that user information of the user equipments synchronized to the target service control device through the synchronization server comprises:
  sequencing, by the source service control device, the flow identification information; and
  sending, by the source service control device, the sequenced flow identification information to the synchronization server when detecting that the user information of the user equipment synchronized to the target service control device through the synchronization server, wherein the synchronization server sends the flow identification information to the target service control device.

6. A service control device, comprising:
a memory;
a processor coupled to the memory and configured to:
  obtain flow identification information of a service flow transmitted between a user equipment and a network, wherein the flow identification information is used for the service control device to identify a traffic type of the service flow when the service control device is a source traffic control device; and
  synchronize the obtained flow identification information to a target service control device when detecting that the user equipment is handed over from the service control device to the target service control device,
wherein the target service control device identifies, according to the flow identification information, the traffic type of the service flow transmitted between the user equipment and the network,
wherein the flow identification information includes packet statistics information of the service flow transmitted between the user equipment and the network and triplet information of the service flow transmitted between the user equipment and the network,
wherein the packet statistics information includes uplink and downlink directions of packets in the service flow transmitted between the user equipment and the network and the number of packets, and
wherein the triplet information includes Internet Protocol (IP) information, port information, and transport layer protocol type of the transmitted service flow.

7. The service control device according to claim 6, further comprising a transmitter coupled to the processor and configured to send the obtained flow identification information to the target service control device when detecting that user information of the user equipment is synchronized to the target service control device.

8. The service control device according to claim 7, wherein the processor is further configured to sequence the flow identification information, and wherein the transmitter is further configured to send the sequenced flow identification information to the target service control device when detecting that the user information of the user equipment is synchronized to the target service control device.

9. The service control device according to claim 6, wherein the processor is further configured to synchronize the flow identification information to the synchronization server when detecting that user information of the user equipment is synchronized to the target service control device through a synchronization server, and wherein the synchronization server synchronizes the flow identification information to the target service control device.

10. The service control device according to claim 9, wherein the processor is further configured to sequence the obtained flow identification information, and wherein the service control device further comprises a transmitter coupled to the processor and configured to send the sequenced flow identification information to the synchronization server when detecting that the user information of the user equipment is synchronized to the target service control device through the synchronization server, and wherein the synchronization server sends the flow identification information to the target service control device.

11. A system for identifying a traffic type across devices, comprising:
  a source service control device;
  a target service control device; and
  a user equipment,
  wherein the user equipment is configured to transmit a service flow with a network through the source service control device,
  wherein the source service control device is configured to:
    obtain flow identification information of the service flow transmitted between the user equipment and the network when the user equipment transmits the service flow with the network through the source service control device, wherein the flow identification information is used for the source service control device to identify a traffic type of the service flow; and
    synchronize the obtained flow identification information to the target service control device when detecting that the user equipment is handed over from the source service control device to the target service control device, and
  wherein the target service control device is configured to identify, according to the flow identification information, the traffic type of the service flow transmitted between the user equipment and the network,
  wherein the flow identification information includes packet statistics information of the service flow transmitted between the user equipment and the network and triplet information of the service flow transmitted between the user equipment and the network, wherein the packet statistics information includes uplink and downlink directions of packets in the service flow transmitted between the user equipment and the network and the number of packets, and wherein the triplet information includes Internet Protocol (IP) information, port information, and transport layer protocol type of the transmitted service flow.

12. The system according to claim 11, wherein the source service control device is further configured to:

obtain the flow identification information of the service flow transmitted between the user equipment and the network when the user equipment transmits the service flow with the network through the source service control device, wherein the flow identification information is used for the source service control device to identify the traffic type of the service flow; and sequence the obtained flow identification information and send the sequenced flow identification information to the target service control device when detecting that user information of the user equipment is synchronized to the target service control device.

13. A system for identifying a traffic type across devices, comprising:

a source service control device;

a target service control device;

a synchronization server; and a user equipment, wherein the user equipment is configured to transmit a service flow with a network through the source service control device, wherein the source service control device is configured to:

obtain flow identification information of the service flow transmitted between the user equipment and the network when the user equipment transmits the service flow with the network through the source service control device, wherein the flow identification information is used for the source service control device to identify a traffic type of the service flow; and synchronize the obtained flow identification information to the synchronization server when detecting that the user equipment is handed over from the source service control device to the target service control device, wherein the synchronization server is configured to send the flow identification information to the target service control device, and wherein the target service control device is configured to identify, according to the flow identification information, the traffic type of the service flow transmitted between the user equipment and the network, wherein the flow identification information includes packet statistics information of the service flow transmitted between the user equipment and the network and triplet information of the service flow transmitted between the user equipment and the network, wherein the packet statistics information includes uplink and downlink directions of packets in the service flow transmitted between the user equipment and the network and the number of packets, and wherein the triplet information includes Internet Protocol (IP) information, port information, and transport layer protocol type of the transmitted service flow.

14. The system according to claim 13, wherein the source service control device is further configured to:

obtain the flow identification information of the service flow transmitted between the user equipment and the network when the user equipment transmits the service flow with the network through the source service control device, wherein the flow identification information is used for the source service control device to identify the traffic type of the service flow; and sequence the obtained flow identification information and send the sequenced flow identification information to the synchronization server when detecting that user information of the user equipment is synchronized to the target service control device through the synchronization server.

15. The service control device according to claim 6, further comprising a memory coupled to the processor and configured to locally store the flow identification information, and wherein the flow identification information is deleted from the memory after synchronizing the flow identification information to the target service control device.

16. The system according to claim 11, wherein the source service control device is further configured to send sequenced flow identification information to the target service control device when detecting that the user information of the user equipment is synchronized to the target service control device in response to sequencing the flow identification information.

17. The system according to claim 11, wherein the source service control device is further configured to locally store the flow identification information in a memory of the source service control device, and wherein the flow identification information is deleted from the memory of the source service control device after synchronizing the flow identification information to the target service control device.

18. The system according to claim 13, wherein the source service control device is further configured to send sequenced flow identification information to the target service control device when detecting that the user information of the user equipment is synchronized to the target service control device in response to sequencing the flow identification information.

19. The system according to claim 13, wherein the source service control device is further configured to locally store the flow identification information in a memory of the source service control device, and wherein the flow identification information is deleted from the memory of the source service control device after synchronizing the flow identification information to the target service control device.

* * * * *

UNITED STATES PATENT AND TRADEMARK OFFICE
CERTIFICATE OF CORRECTION

PATENT NO. : 9,872,207 B2
APPLICATION NO. : 14/516795
DATED : January 16, 2018
INVENTOR(S) : Shifei Bi Page 1 of 1

It is certified that error appears in the above-identified patent and that said Letters Patent is hereby corrected as shown below:

In the Claims

Column 13, Lines 24-41, Claim 5 should read:
5. The method according to claim 4, wherein synchronizing, by the source service control device, the flow identification information to the synchronization server, wherein the synchronization server synchronizes the flow identification information to the target service control device when detecting that user information of the user equipment is synchronized to the target service control device through the synchronization server comprises:
    sequencing, by the source service control device, the flow identification information; and
    sending, by the source service control device, the sequenced flow identification information to the synchronization server when detecting that the user information of the user equipment is synchronized to the target service control device through the synchronization server, wherein the synchronization server sends the flow identification information to the target service control device.

Signed and Sealed this
Thirteenth Day of March, 2018

Andrei Iancu
*Director of the United States Patent and Trademark Office*